March 27, 1928.  H. DALTON  1,663,828
LATHE HEAD STOCK
Filed June 5, 1925    3 Sheets-Sheet 1
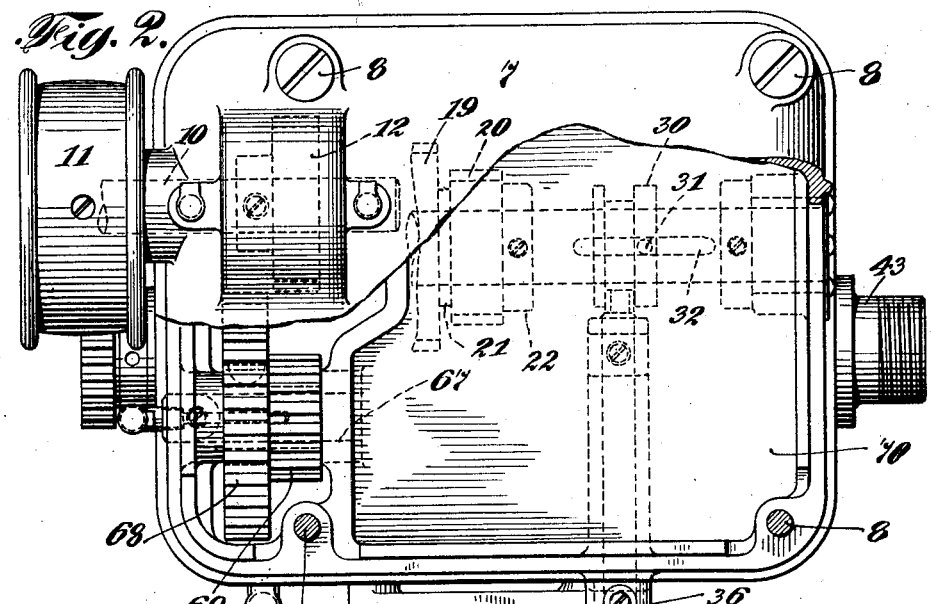
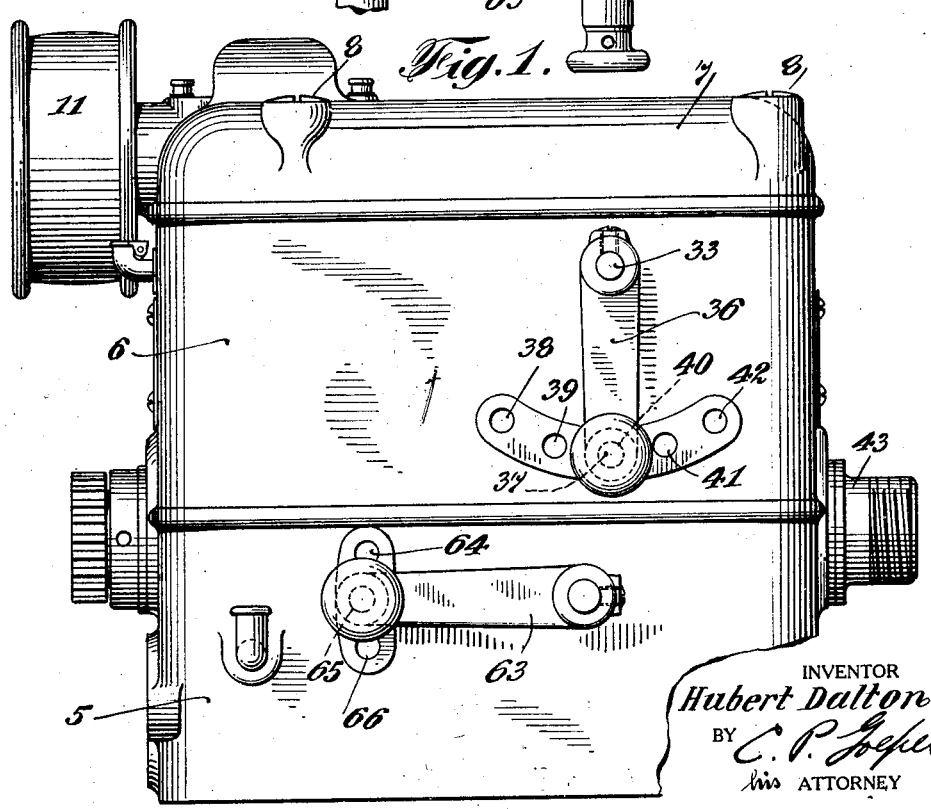
INVENTOR
Hubert Dalton
BY
his ATTORNEY March 27, 1928.
H. DALTON
LATHE HEAD STOCK
Filed June 5, 1925
1,663,828
3 Sheets-Sheet 2
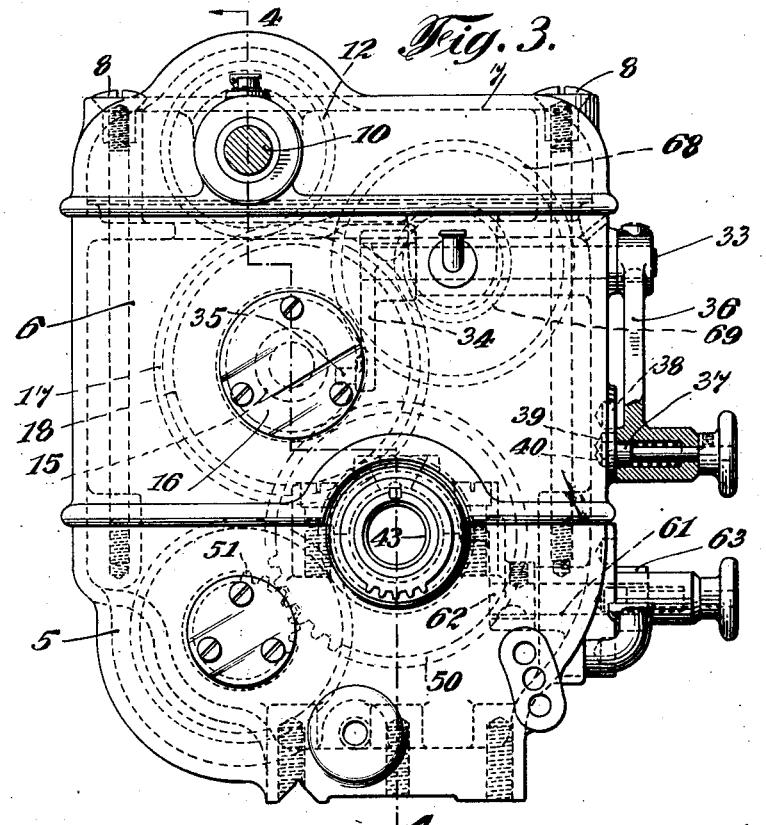
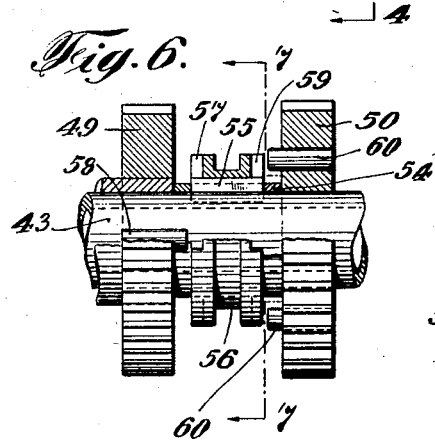
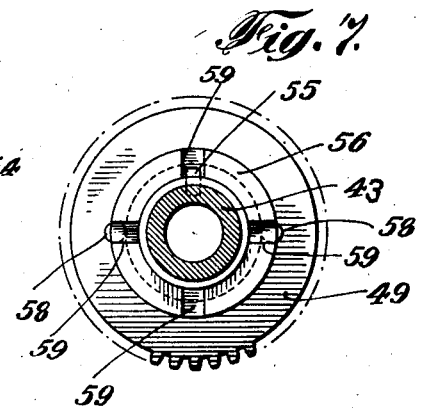
INVENTOR
Hubert Dalton
BY C. P. Goepel
his ATTORNEY March 27, 1928.

H. DALTON 1,663,828

LATHE HEAD STOCK

Filed June 5, 1925

INVENTOR
Hubert Dalton
BY C. P. Goepel
his ATTORNEY

Patented Mar. 27, 1928.

1,663,828

UNITED STATES PATENT OFFICE.

HUBERT DALTON, OF STAMFORD, CONNECTICUT.

LATHE HEADSTOCK.

Application filed June 5, 1925. Serial No. 35,043.

This invention relates to lathe head stocks, and has for its primary object to provide a geared head stock for lathes in which the various gear elements at all times remain in constant mesh and which is provided with means whereby the head stock spindle may be selectively driven at any one of a series of relatively different speeds.

It is another object of my present improvements to provide a geared head stock spindle in which the parts are very compactly mounted and arranged, and which may be operated directly by an electric motor or by means of a driving belt from a remote power source.

It is also a further object of my invention to provide an improved sectional construction of the housing or casing for the drive gearing for the head stock spindle and the mounting and arrangement of the gear elements in said housing sections which permits of the easy and quick disassemblage of the gearing for purposes of inspection or repair.

It is also one of the novel features of the invention to provide a simple and effective clutch device for locking any one of a series of normally idle power transmission gears in operative connection with a countershaft and to provide suitable means whereby the adequate and continuous lubrication of the various parts is assured.

With the above and other objects in view, the invention consists in the improved lathe head stock, and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of my present improvements and in which similar reference characters designate corresponding parts throughout the several views,—

Figure 1 is a side elevation of the lathe head stock embodying my present improvements;

Fig. 2 is a top plan view, the upper housing section being partly broken away;

Fig. 3 is an end elevation;

Fig. 6 is a detail fragmentary elevation partly in section, and

Fig. 7 is a sectional view taken on the line 7—7 of Fig. 6.

Figure 5:
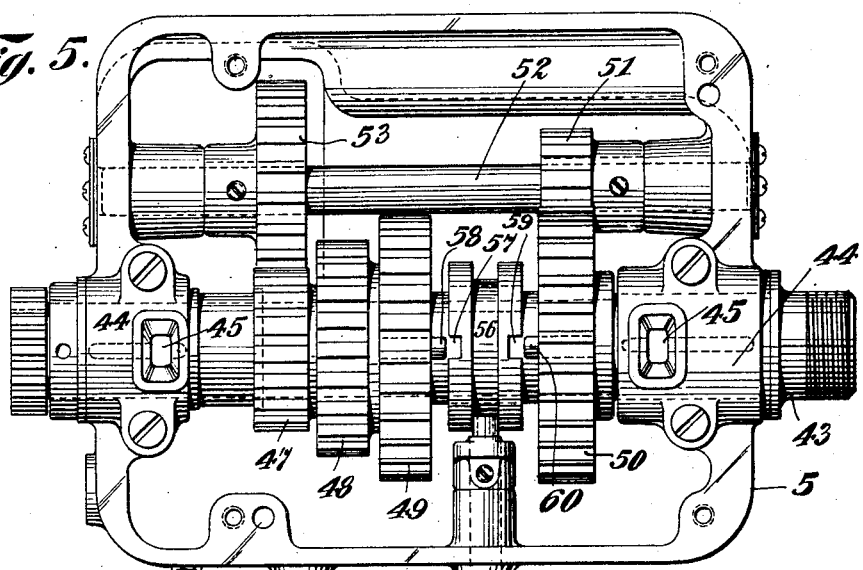
Fig. 5 is a top plan view, the intermediate and top sections of the housing being removed.

In the illustrated construction, I have shown the various parts of the mechanism wholly enclosed within a dust-proof casing or housing. In the present disclosure, this housing consists of a lower or base section 5, an intermediate section 6 and an upper or top section 7. These housing sections are rigidly secured together in assembled relation by means of a plurality of vertical bolts 8 extending through aligned openings in the walls of said housing sections, and which may also have threaded engagement at their lower ends in a suitable base or support on which the head stock is mounted.

In suitably spaced bearings 9 in one end of the upper housing section 7 a driving shaft 10 is journalled. One end of this shaft extends beyond the end of the housing and has a belt wheel 11 suitably fixed thereon. Between the bearings 9 a gear 12 is rigidly secured to the shaft 10.

In suitable bearings 13 and 14 respectively, mounted in the opposite end walls of the intermediate housing section 6 the ends of a hollow countershaft 15 are rotatably supported. The outer ends of these bearings are closed by the plates 16 secured to the housing walls. Upon the countershaft 15 a gear 17 is keyed or otherwise securely fixed and is in constant mesh with the gear 12 on the driving shaft 10. A series of additional gears 18, 19 and 20 respectively, are loosely mounted upon the shaft 15 and between these gear elements spacing collars 21 of hardened steel are arranged. Said gear elements are held against relative longitudinal shifting movement by a collar 22 fixed upon the shaft 15 and engaging the outer side of the gear 20. Each of the gear elements 18, 19 and 20 is provided with a keyway 23 which is adapted to receive one end of a clutch dog 24 operating in a slot 25 in the wall of the countershaft 15. The other end of this dog is pivotally connected as at 26 to one end of a rod 27 arranged to slide freely within the countershaft 15. The dog 24 is normally urged in one direction to its effective position in engagement with one of the gear elements by means of a leaf spring 28 which is fixed at one of its ends to said dog and at its other end has sliding contact with the wall of the countershaft 15. The free end of the clutch dog is formed with a cam surface 29, the purpose of which will be hereinafter described.

A peripherally grooved collar 30 loosely surrounds the shaft 15 and is connected by means of a pin 31 with the slide rod 27, said pin moving in longitudinal slots 32 formed in the opposite sides of the hollow countershaft 15.

A transversely positioned shaft 33 is suitably mounted in the intermediate housing section 6 and has one of its ends extended through one of the side walls thereof. Upon the other or inner end of said shaft a crank arm 34 is fixed and is provided with a stud or pin 35 loosely engaged in the peripheral groove of the collar 30. The other or outer end of this shaft is provided with an operating crank handle 36 carrying a spring pressed latch pin 37 adapted for engagement in any one of a series of spaced sockets 38, 39, 40, 41 and 42 respectively, provided in the outer side of the housing wall or in a plate suitably fixed thereto.

The head stock spindle 43 is journalled in bearings on the opposite end walls of the lower housing section 5, said bearings having removable cap sections 44, each of which is provided with an oil receiving pocket 45. Suitable packing gaskets 45′ are arranged between the walls of the intermediate housing section 6 and these bearing caps. Upon the spindle 43 a sleeve 46 is loosely mounted and this sleeve is provided with a series of relatively fixed gears 47, 48 and 49 respectively, said gears having constant meshing engagement with the gears 18, 19 and 20 respectively on the countershaft 15. In spaced relation to the gear 49, a relatively large gear 50 is loosely mounted on the spindle 43 and this gear has constant meshing engagement with a small gear or pinion 51 fixed upon a shaft 52 journalled in suitable bearings on the end walls of the housing section 5. A second gear 53 is also fixed on this shaft and has constant meshing engagement with the gear 47.

A spacing sleeve 54 is arranged between the gears 49 and 50 and is fixed to the spindle 43 by a key 55. A collar 56 loosely surrounds this sleeve for sliding movement thereon and has a keyway receiving the key 55 whereby said collar is held against relative rotation. This collar is provided in one of its side faces with diametrically opposite recesses 57 adapted to receive oppositely located pins or studs 58 projecting from the face of the gear 49. The opposite side face of said collar is also provided with similar recesses 59 to receive the pins 60 projecting from the face of the gear 50. The collar 56 has a peripheral groove to receive a pin or stud carried by a crank arm 62 on the inner end of a shaft 61 suitably mounted in the wall of the lower housing section 5. The outer end of said shaft is provided with an operating handle 63 carrying a spring pressed latch pin similar to the pin 37 above referred to for engagement in any one of a series of sockets 64, 65 or 66 provided on the outer side of the housing wall.

In one end of the housing section 6 there is mounted in suitably spaced bearings an additional shaft 67 upon which gear elements 68 and 69 are loosely mounted and normally run idle thereon. These gears may be integrally formed with each other or suitably connected by any approved means. The smaller gear 69 is in constant mesh with the gear 17 fixed on the countershaft 15.

Figure 4:
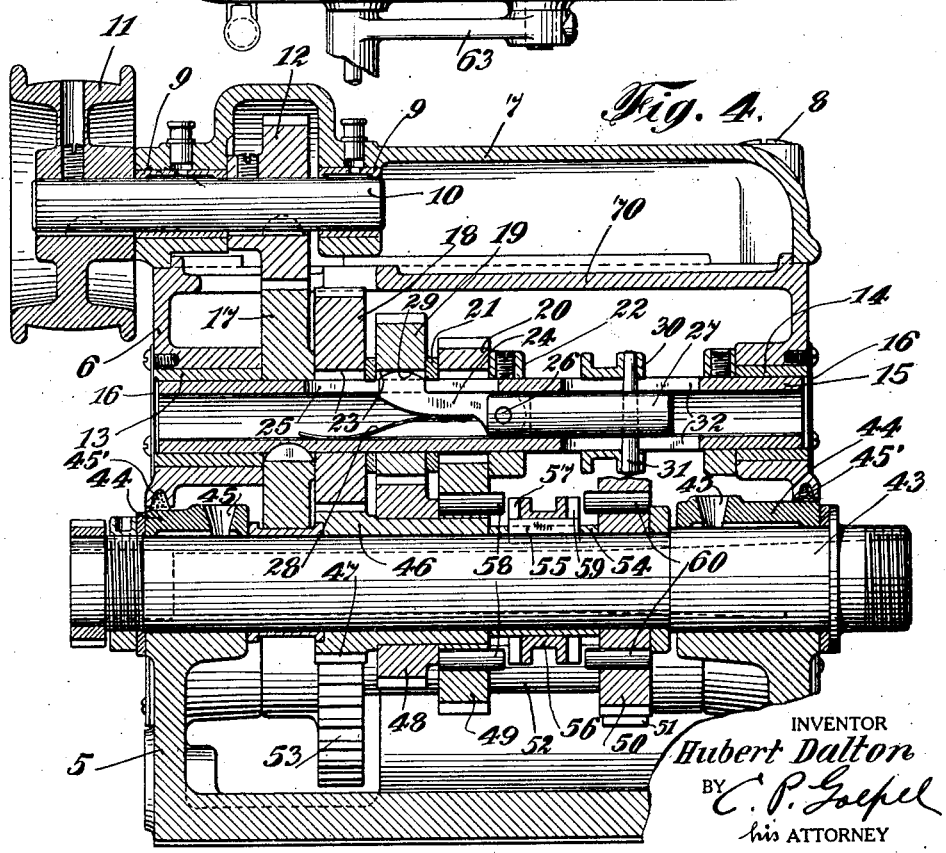
Fig. 4 is a longitudinal section taken on the line 4—4 of Fig. 3.

Having now described the several structural parts of the head stock and the arrangement of the drive mechanism for the head stock spindle, the operation thereof may be explained as follows. Assuming that the operating power is obtained from a belt engaged with the wheel 11, the countershaft 15 will be rotated through the gears 12 and 17, and with the parts arranged as shown in Fig. 4 of the drawings wherein the gear 19 is locked by clutch dog 24 to said countershaft, the sleeve 46 with the gears thereon will be rotated idly on the spindle 43. In order to impart rotation to the spindle, the operator releases the handle 63 from the neutral position shown in Fig. 1 by pulling the latch pin outwardly and moves the handle downwardly to engage the latch pin in the socket 66. In such movement, the collar 56 is shifted to the left from its position in Fig. 4 to thereby engage the pins 58 on gear 49 in opposite recesses 57 of said collar thus locking the sleeve 46 and the series of gears thereon to the spindle 43. Rotation will then be transmitted to said spindle at a speed determined by the ratio between gears 19 and 48 while the gears 18 and 20 on the countershaft will be rotated idly from the gears 47 and 49. To change the speed of rotation of the spindle 43, the operator actuates the handle 36. Thus, if this handle is moved to the left from the position shown in Fig. 1, the collar 30 will be shifted on the countershaft 15 in the same direction and when the latch pin 37 engages in socket 39, the cam face 29 on the free end of the dog 24 is engaged with the spacing collar 21 between gears 18 and 19. Thus the clutch dog is in a neutral position and all of the gears are released from connection with the countershaft. Upon a further movement of the handle 36 in the same direction, the end of the dog moves off of the collar 21 and snaps into the keyway 23 in gear 18, at which time the latch pin 37 engages in the socket 38. Rotation will then be transmitted to the spindle 43 at a different speed through gears 18 and 47. If the handle 36 is shifted in the opposite direction or to the right, when pin 37 engages in socket 41, the clutch dog will be engaged with the collar 21 between the gears 19 and 20 and be disposed in a neutral position and upon a further movement of the handle to engage the latch pin in socket 42, said clutch dog engages in the keyway of gear 20, thus locking said gear to the countershaft while the other gears 18 and 19 may rotate idly thereon. Rotation will now be transmitted to the head stock spindle through the gears 20 and 49.

Three additional speeds of the head stock spindle may be obtained by selectively clutching the gear elements 18, 19 and 20 on the countershaft, and then shifting collar 56 to the right from the position shown in Fig. 4 to engage pins 60 on gear 50 with the recesses 59 in said collar. This movement is obtained by shifting the handle 63 upwardly from the position shown in Fig. 1 and engaging its latch pin in the socket 64. Rotation will now be transmitted to the head stock spindle through the selected gear 18, 19 or 20, the gear 47, gear 53 on shaft 52 and hence through gear 51, gear 50 and collar 56. Thus, owing to the different gear ratios and the selectively operable clutch means for the power transmission gear elements, it is possible to drive the head stock spindle at any one of six different speeds.

When it is desired to operate the head stock spindle by means of an individual electric motor, the upper housing section 7 with the shaft 10 and gear 12 is removed and the motor is mounted on the top plate 70 of the intermediate housing section 6. The motor shaft is provided with a suitable gear meshed with the gear 68. Thus the spindle driving mechanism will then be operated from the motor shaft through the gear 68 and gear 69 which is in constant mesh with gear 17 on the countershaft. Therefore, it will be seen that by this means, my improved head stock is available for use in those cases where a large primary source of power cannot be obtained.

The lower or base section 5 of the housing is filled with a suitable lubricating oil, and in the operation of the gearing, this oil is thrown upwardly upon the various gear elements and also collects in the pockets 45 and is distributed to the bearings for the head stock spindle. Thus, continuous automatic lubrication is secured.

It will be evident that since all of the various gear elements remain constantly in mesh with each other, the possibility of breaking the gear teeth which is a common occurence in that type of lathe head stock in which the gears are engaged and disengaged relative to each other by a relative shifting movement, will not occur. Further, it will be seen that the clutch means which I have devised for selectively locking the change speed gears to the countershaft, is exceedingly simple, easily operated and not liable to get out of order. However, should it become necessary to repair any of the parts, this may be readily done by merely removing the fastening bolts 8 and then lifting off the upper housing section 7. The intermediate section 6 of the housing with the gearing mounted therein can then be removed, thus admitting of the thorough inspection of all parts of the mechanism. After the proper repairs, if any, have been made the several housing sections can then be quickly and easily re-assembled.

I have herein shown and described an embodiment of my present improvements which I have found to give excellent results in actual practice, nevertheless it will be understood that the essential features of the invention are susceptible of being incorporated in various other alternative structures, and I accordingly reserve the privelege of adopting all such legitimate changes therein as may be fairly embodied within the spirit and scope of the invention as claimed.

I claim:

1. In a lathe head stock, a housing, a head stock spindle mounted in said housing and having drive gearing thereon, a countershaft mounted in the housing, selective speed change gearing on said countershaft engaged with the gearing on said spindle, an additional gear fixed to the countershaft, said housing including an upper removable section, drive means mounted in said removable housing section and having a gear engaged with the fixed gear on the countershaft, an additional shaft mounted in said housing, a pair of gears loosely mounted thereon, one of said gears being engaged with the fixed gear on the countershaft, said top section of the housing with said drive means adapted to be removed and an electric motor substituted therefor, the motor shaft being provided with a gear adapted for engagement with the other of said last named gears.

2. Gearing comprising a shaft, a plurality of gears of different diameters thereon and means for connecting the individual gears selectively with the shaft, means for driving said shaft, a driven shaft, a sleeve revoluble thereon, a plurality of gears fixed on the sleeve and of different diameters and meshing with the respective gears first mentioned, another gear mounted revolubly on the driven shaft, a shifter splined on the driven shaft to selectively connect said sleeve or said last named gear therewith, and another shaft having a gear engaging one of the gears on said sleeve and another gear engaging the last named gear mounted on the driven shaft.

In testimony that I claim the foregoing as my invention, I have signed my name hereto.

HUBERT DALTON.